United States Patent
Perks et al.

(10) Patent No.: US 7,305,678 B2
(45) Date of Patent: Dec. 4, 2007

(54) METHOD AND SYSTEM FOR REDUCING SYNCHRONIZATION WAITS WHEN ALLOCATING SEQUENCED IDENTIFIERS IN A MULTI-THREADED SERVER

(75) Inventors: Michael Albert Perks, Austin, TX (US); Mark David Nielsen, Houston, TX (US); Kirk Allan Fritsche, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/859,299

(22) Filed: May 17, 2001

(65) Prior Publication Data

US 2002/0174162 A1   Nov. 21, 2002

(51) Int. Cl.
*G06F 9/44* (2006.01)
*G06F 7/00* (2006.01)
*G06F 9/46* (2006.01)

(52) U.S. Cl. .................... 719/311; 707/103 R; 707/8; 718/104

(58) Field of Classification Search ............... 707/103, 707/104, 103 R, 8; 719/311; 718/104
See application file for complete search history.

(56) References Cited

U.S. PATENT DOCUMENTS 5,522,077 A * 5/1996 Cuthbert et al. ........ 707/103 R
6,687,707 B1 * 2/2004 Shorter ................... 707/103 R

* cited by examiner

*Primary Examiner*—Meng-Al T. An
*Assistant Examiner*—Camquy Truong
(74) *Attorney, Agent, or Firm*—Hamilton & Terrile, LLP; Stephen A. Terrile

(57) ABSTRACT

A method, a system, an apparatus, and a computer program product are presented for reducing synchronization waits when unique sequential identifiers are being allocated for transactions committed to a database that are occurring in a multi-threaded server environment. A transactional object containing an identifier data item is created for a transaction in an object-oriented environment. A pre-process object is then generated that contains the transactional object; when subsequently processed, the pre-process object allocates a sequential identifier value for the identifier data item. The pre-process object is added to a list of pre-process objects that are to be processed prior to completing the transaction, such as committing the transaction to a database. After some initial business logic processing, a commit operation for the transaction is commenced during which the pre-process object is processed, thereby allocating a sequential identifier value for the identifier data item just prior to committing the transaction.

14 Claims, 11 Drawing Sheets

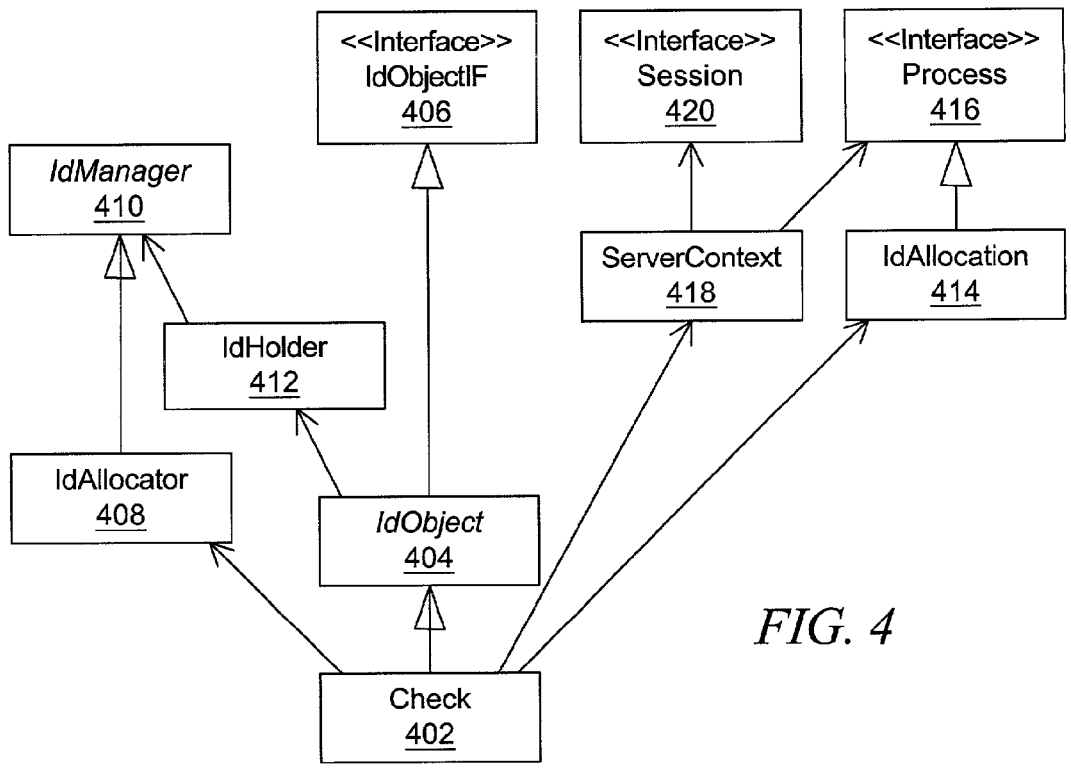

FIG. 4

```
public class Check extends IdObject {    — 402
    /**
     * null constructor
     */
    Check() {    — 502
    }

/**
     * create a new check
     */
    public static Check newCheck(ServerContext context) throws Exception {    — 602
        Check check;
        try {
            check = new Check();    — 604
            context.beginTransaction();    — 606
            check.updateId(null, new IdAllocator());    — 608
            context.addPreProcess(new IdAllocation(check));    — 610
            context.commitTransaction();    — 612
        } catch (Exception e) {
            throw e;
        }
        return check;
    }
}
```

FIG. 6

```
/*
 * Abstract base class for all Objects that have an Id    — 402
 */
public abstract class IdObject extends Object implements IdObjectIF {    — 404
        /**
         * This object's Id Holder
         */
        private IdHolder IdHolder = new IdHolder();    — 504
        /**
         * Returns this object's Id
         */
        public final String getId() {    — 526
                return getIdHolder().getId();    — 758
        }
        /**
         * Insert the method's description here.
         */
        public IdHolder getIdHolder() {    — 528
                return IdHolder;
        }
        /**
         * Returns this object's Id manager
         */
        public final IdManager getIdManager() {
                return getIdHolder().getIdManager();
        }
        /**
         * Sets this object's Id
         */
        public final void setId(String Id) {
                getIdHolder().setId(Id);
        }
        /**
         * Updates this objects Id as appropriate
         *
         * @param Id String to set the Id to.  Can be null.  If null, the manager is used
         * @param manager IdManager to set the Id used.  Used only if string is null and holder
         *        does not already have a manager
         */
        public void updateId(String Id, IdManager manager) {    — 512
                getIdHolder().updateId(Id, manager);    — 750
        }
}
```

*FIG. 7A*

```
/*
 * Interface for all Objects that have an Id
 */
public interface IdObjectIF {    — 406
        public String      getId();

public IdManager   getIdManager();

public void        setId(String Id);

public void        updateId(String Id, IdManager manager);
}
```

*FIG. 7B*

```
/*
 * interface for unit of work session
 */
public interface Session {     — 420 public void abortTransaction();

public void beginTransaction();    — 508 public void commitTransaction();    — 538
}
```

*FIG. 7C*

```
public interface Process {    — 416
        public void execute(ServerContext context) throws Exception;
}
```

*FIG. 7D*

```
/*
 * Pre-process class to get ids.
 */
public class IdAllocation implements Process {    — 414
        IdObjectIF idObject;    — 702

/**
         * IdAllocation constructor comment.
         */
        public IdAllocation(IdObjectIF IdObject) {    — 518
                this.idObject = IdObject;
        }
        /**
         * Sets id.
         */
        public void execute(ServerContext context) {    — 524
                idObject.getId();    — 756
        }
}
```

*FIG. 7E*

```
/*
 * base class for IdManagers
 */
public abstract class IdManager implements java.io.Serializable {    — 410
        /**
         * The Id that this manager is holding
         */
        protected String Id;
        /**
         * Returns this manager's Id, initializing it if necessary.
         */
        public abstract String getId();    — 766
        /**
         * Sets this manager's Id
         */
        public void setId(String Id) {
                this.Id = Id;
        }
}
```

*FIG. 7F*

```
public class IdAllocator extends IdManager {   — 408
    /**
     * Sets the type of ID that this allocator will be allocating.
     */
    public IdAllocator() {   — 510
    }
    /**
     * Initializes this manager's Id.
     */
    String allocateId() {   — 536
        // specific code to allocate next id
        return "defaultId";
    }
    /**
     * Returns this manager's Id, initializing it if necessary.
     *
     * @return String Id
     */
    public String getId() {   — 534
            return allocateId();   — 762
    }
    /**
     * Sets this manager's ID
     */
    public void setId(String Id) {
            System.out.println("Manually setting an Id that should be automatically allocated.");
            super.setId(Id);
    }
}
```

*FIG. 7G*

```
/*
 * Holds the details of Id allocation and management.
 */
public class IdHolder {   — 412
    /**
     * The manager that handles allocation of Id
     */
    private IdManager manager;   — 754
    /**
     * Returns this manager's Id, initializing it if necessary.
     */
    public String getId() {   — 530
            if (getIdManager() == null) {
                    return null;
            }
            return getIdManager().getId();   — 760
    }
    /**
     * Returns this holder's manager
     */
    public IdManager getIdManager() {   — 532
            return manager;
    }
```

*FIG. 7H*

```
/**
 * Continuation of class IdHolder
 */

/**
     * Sets this manager's Id
     */
    public void setId(String Id) {    — 764
            // check to see if manager is null
            if (getIdManager() == null) {
                    // if Id is null, it's okay for manager to be null
                if (Id == null) {
                  return;
                }

// otherwise, construct a manager
          IdManager manager = new IdAllocator();
          manager.setId(Id);
        setIdManager(manager);
            } else {
               // since manager isn't null, set its Id
               getIdManager().setId(Id);
            }
    }
    /**
     * Sets this holder's manager
     */
    private void setIdManager(IdManager manager) {    — 516
            if (getIdManager() != null) {
                    System.out.println("Resetting a holder's Id manager.");
            }
            this.manager = manager;
    }
    /**
     * Updates this holder's Id as appropriate
     *
     * @param Id String to set the Id to.  Can be null.  If null, the manager is used
     * @param manager IdManager to set the Id used.  Used only if string is null and holder
     *        does not already have a manager.
     */
    public void updateId(String Id, IdManager manager) {    — 514
            if (Id != null) {
                    if (getId() == null || !getId().equals(Id)) {
                            setId(Id);
                    }
            } else if (getIdManager() == null) {
                    setIdManager(manager);    — 752
            }
    }

/**
     * null constructor
     */
    IdHolder() {    — 504
    }
}
```

*FIG. 7I*

```
public class ServerContext {    — 418

/**
     * interface to unit of work session
     */
    private Session session;

private java.util.Vector postProcesses = new java.util.Vector(2);
    private java.util.Vector preProcesses = new java.util.Vector(2);

/**
     * initialization of contextual data
     */
    ServerContext() {
            initSession();
    }

/**
     * @param process
     */
    public void addPostProcess(Process process) {    — 704
            if(!postProcesses.contains(process)) {
                    postProcesses.addElement(process);
            }
    }
    /**
     * @param process
     */
    public void addPreProcess(Process process) {    — 520
            if(!preProcesses.contains(process)) {
                    preProcesses.addElement(process);
            }
    }
    /**
     * Start a transaction.
     * Updated objects are persisted when commitTransaction is called.
     */
    public void beginTransaction() {    — 506
            if (getSession() != null) {
                    getSession().beginTransaction();
            }
    }
```

*FIG. 7J*

```
/**
 * Continuation of class ServerContext
 */

/**
         * Commit to database changes done since the last beginTransaction.
         */
        public void commitTransaction() throws Exception {    — 522
                try {
                        // execute pre processes
                        java.util.Enumeration preElements = preProcesses.elements();
                        while(preElements.hasMoreElements()) {    — 706
                                Process process = (Process)preElements.nextElement();    — 712
                                process.execute(this);    — 714
                        }

// commit the session
                        if (getSession() != null) {
                                getSession().commitTransaction();    — 708
                        }

// execute post processes
                        java.util.Enumeration postElements = postProcesses.elements();
                        while(postElements.hasMoreElements()) {    — 710
                                try {
                                        Process process = (Process)postElements.nextElement();
                                        process.execute(this);
                                }
                                catch(Exception e) { }
                        }
                }
                finally {
                }
        }

/**
         * Create and initialize an ServerContext.
         */
        protected void initSession() {
          // creates unit of work
          // session = new ...();
        }

/**
         * Get the session attribute.
         */
        protected Session getSession ( ) {
                return session;
        }
}
```

*FIG. 7K*

METHOD AND SYSTEM FOR REDUCING SYNCHRONIZATION WAITS WHEN ALLOCATING SEQUENCED IDENTIFIERS IN A MULTI-THREADED SERVER

BACKGROUND OF THE INVENTION

1. Field of the Invention

The present invention relates to an improved data processing system and, in particular, to a method and apparatus for resource allocation within a runtime environment. Still more particularly, the present invention provides a method and apparatus for implementing the allocation of a specific resource using object-oriented late binding.

2. Description of Related Art

In many computer environments, it is desirable for a data processing system to handle many tasks concurrently. For example, a multi-threaded server can be used to simultaneously process transactions from multiple clients.

In many applications, a transaction needs to be assigned a unique identifier, such as for recording the transaction by management software or for use within the data processing of the transaction itself. In some cases, the unique identifiers must be assigned in strictly sequential order. When a particular transaction needs an identifier, the transaction is assigned the next identifier in the sequence of identifiers. If the transaction fails, then the assigned identifier must not be discarded and must be used for the next transaction without skipping any identifiers in the sequence. For example, an application might use pre-printed paper forms, such as tamper-proof tickets for a sporting event, on which the application outputs dynamically generated data. Each ticket must be printed in sequence, and the application would need to keep track of the number of tickets that have previously been printed. In general, unique identifiers can be classified as either global, in which case the identifiers must be unique across all possible clients, or local, in which case the identifiers must be unique for each categorization of clients. An example for using locally unique sequence of identifiers might include a situation in which each branch office of a company can have its own printer such that the identifiers need to be unique only for a given branch office.

As with most computational tasks, maintaining a sequence of unique identifiers should be accomplished not only accurately but also efficiently. A potential problem with sequencing unique identifiers involves the fact that once an identifier has been allocated, the next identifier in the sequence cannot be allocated until the preceding identifier has been successfully committed to the database. The strict sequencing process effectively limits the throughput on the server because of the potentially large synchronization delays.

Transaction processing on the server typically requires a number of pre-processing tasks before the transaction can be committed. The pre-processing tasks may include tasks such as validation, creation of new objects, and queries against the existing database. If a unique identifier is allocated too early, then all the other transactions are stymied until the blocking transaction has finished its tasks and commits to the database. Once the commit has occurred, then the next waiting transaction can allocate its identifier.

Therefore, it would be advantageous to have a methodology for reducing synchronization waits when unique, sequenced identifiers are being allocated for transactions that are occurring in a multi-threaded server environment.

SUMMARY OF THE INVENTION

A method, a system, an apparatus, and a computer program product are presented for reducing synchronization waits when unique sequential identifiers are being allocated for transactions committed to a database that are occurring in a multi-threaded server environment. A transactional object containing an identifier data item is created for a transaction in an object-oriented environment. An identifier management object may be created and set within the transactional object in order to select one of a plurality of methodologies for allocating an identifier value for the identifier data item. A pre-process object is then generated that contains the transactional object; when subsequently processed, the pre-process object allocates a sequential identifier value for the identifier data item. The pre-process object is added to a list of pre-process objects that are to be processed prior to completing the transaction, such as committing the transaction to a database. After some initial business logic processing, a commit operation for the transaction is commenced during which the pre-process object is processed, thereby allocating a sequential identifier value for the identifier data item just prior to committing the transaction.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 4 depicts a UML class diagram for a set of object-oriented classes that may be used in constructing an application in accordance with a preferred embodiment of the invention;

FIG. 6 depicts an object-oriented class that provides an example of a simple application that uses pre-processes in combination with IdHolder objects for allocating identifiers in accordance with a preferred embodiment of the invention; and FIGS. 7A-7K depict a set of object-oriented classes that provide a set of base classes that support allocating identifiers in accordance with a preferred embodiment of the present invention.

DETAILED DESCRIPTION OF THE INVENTION

The present invention is directed to a system and a methodology for reducing synchronization waits when unique sequential identifiers are being allocated for transactions that are occurring in a multi-threaded server environment. As background, a typical organization of hardware and software components within a distributed data processing system is described prior to describing the present invention in more detail.

Figure 1A:
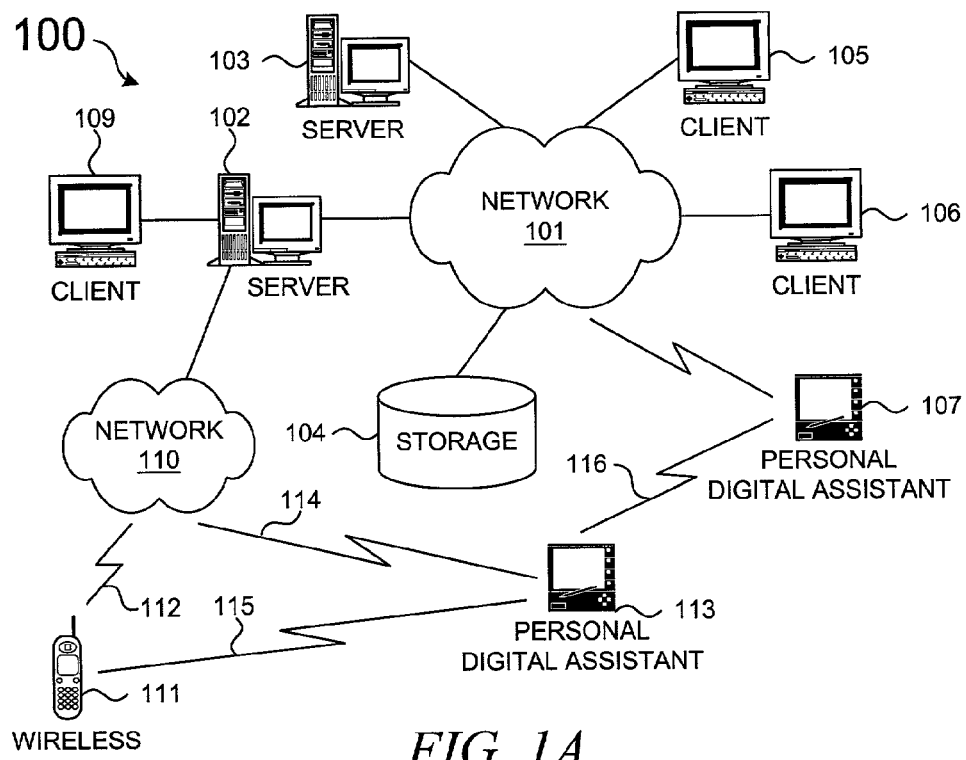
FIG. 1A is a block diagram that depicts a typical distributed data processing system in which the present invention may be implemented.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links.

Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
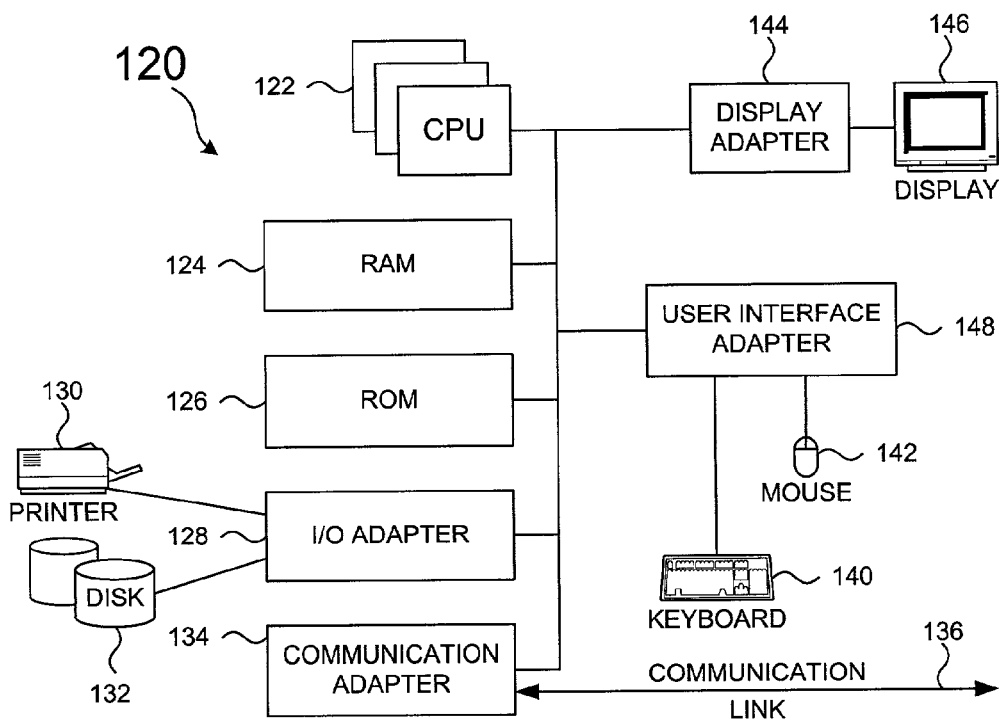
FIG. 1B is a block diagram that depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP) and other types of special purpose processors, and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device may contain a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

Figures 2A, 2B:
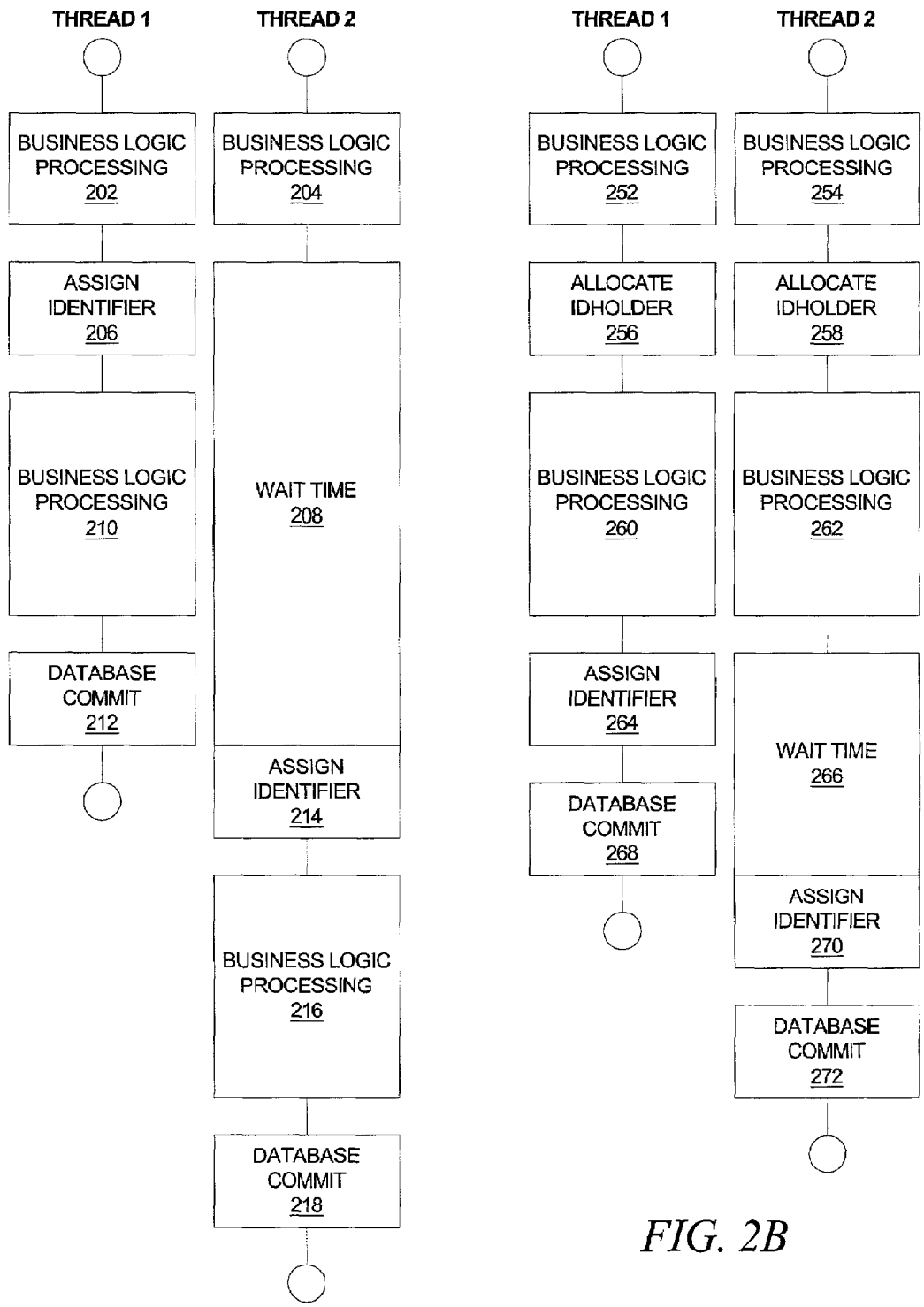
FIG. 2A is a timing diagram that depicts a sequence of computational steps that may occur within a pair of threads in a known transaction processing system.
FIG. 2B is a timing diagram that depicts a sequence of computational steps that may occur within a pair of threads in a transaction processing system that is implemented in accordance with the present invention.

The present invention may be implemented on a variety of hardware and software platforms, as described above. More specifically, though, the present invention is directed to a system and a methodology for reducing synchronization waits when unique sequential identifiers are being allocated for transactions that are occurring in a multi-threaded server environment, as described in more detail with respect to FIGS. 3-7K. In order to emphasize the advantages obtained by implementing the present invention, a high level comparison of the prior art and the present invention is preliminarily provided by FIG. 2A and FIG. 2B. It should be noted that the timing diagrams within FIGS. 2A-2B are not shown to scale. It should also be noted that the following illustrations assume that the application or database provides a locking mechanism for ensuring that the identifier assignment process occurs in a synchronized manner.

With reference now to FIG. 2A, a timing diagram depicts a sequence of computational steps that may occur within a pair of threads in a known transaction processing system. As previously mentioned above, a potential problem with allocating a sequence of unique identifiers involves the fact that once an identifier has been allocated, the next identifier in the sequence cannot be allocated until the preceding identifier has been successfully committed to the database. The strict sequencing process effectively limits the throughput on the server because of the large synchronization delays.

FIG. 2A illustrates this problem by showing two threads, Thread 1 and Thread 2, each of which perform similar processing, which initially includes business logic processing steps 202 and 204, respectively. However, when Thread 1 requests and is assigned an identifier at step 206, Thread 2 is blocked from further processing at step 208 and must wait for Thread 1 to complete its processing. Thread 1 continues with its additional business logic processing at step 210. If this additional business logic requires the assigned identifier, then the benefit of the late binding introduced by this invention may be reduced. At the conclusion of the transaction, Thread 1 commits its processing results to a database at step 212.

After Thread 1 has committed its results to the database, then Thread 2 is no longer blocked, and Thread 2 can be assigned an identifier at step 214. Thread 2 continues with its additional business logic processing at step 216. At the conclusion of the transaction, Thread 2 commits its processing results to the database at step 218.

With reference now to FIG. 2B, a timing diagram depicts a sequence of computational steps that may occur within a pair of threads in a transaction processing system that is implemented in accordance with the present invention. FIG. 2B is similar to FIG. 2A in that both figures show a timing diagram for the process steps that are performed by a pair of threads. However, in the present invention, the attribute for the unique identifier is wrapped using another class in order to defer assignment of a value to the identifier data item. Only when the identifier value is needed for the business logic processing prior to the database commit is the actual identifier value generated and made available to a thread. The methodology of the present invention is applicable to many types of computational purposes because the identifier is only required just prior to a database commit action.

In the preferred embodiment of the present invention, it is assumed that there is a subclass of "IdObject", and an object of that subclass would require a unique sequential identifier for some transactional purpose. A wrapper class named "IdHolder" is used in a lazy instantiation manner. The IdObject class (including any subclass of the IdObject class) defers evaluation of the identifier to the IdHolder class. In a preferred embodiment, the IdHolder class itself wraps the implementation of retrieving an identifier, e.g., an IdManager class is used as a generic mechanism for "managing" the different ways an identifier can be generated.

Referring to FIG. 2B, both Thread 1 and Thread 2 comprise the necessary functionality to implement the present invention. Thread 1 and Thread 2 perform similar processing, which initially includes business logic processing steps 252 and 254, respectively. However, when either Thread 1 or Thread 2 reach a point at which they can determine that they shall need a unique, sequential identifier, each thread reserves storage space for an identifier data item at step 256 and step 258, respectively, by allocating, i.e., instantiating, an object of type IdHolder. Neither thread is blocked from further business logic processing at steps 260 and 262, respectively, as each thread can continue with further business logic processing that does not yet need the actual value of the identifier.

At some point, Thread 1 finishes its business logic processing and needs to perform final processing actions that require the assigned identifier. At that point, e.g., step 264, Thread 1 is assigned its unique, sequential identifier, and Thread 2 is blocked from further processing at step 266. At the conclusion of the transaction, Thread 1 commits its processing results to a database at step 268.

After Thread 1 has committed its results to the database, then Thread 2 is no longer blocked, and Thread 2 can be assigned an identifier value at step 270 because it needs to perform final processing actions that require its unique, sequential identifier. At the conclusion of the transaction, Thread 2 commits its processing results to the database at step 272.

As noted above, the timing diagram is not drawn to scale, and one of ordinary skill in the art would understand that the additional overhead for allocating and using the IdHolder object is relatively minor compared to other business logic that needs to be performed.

Figure 3A:
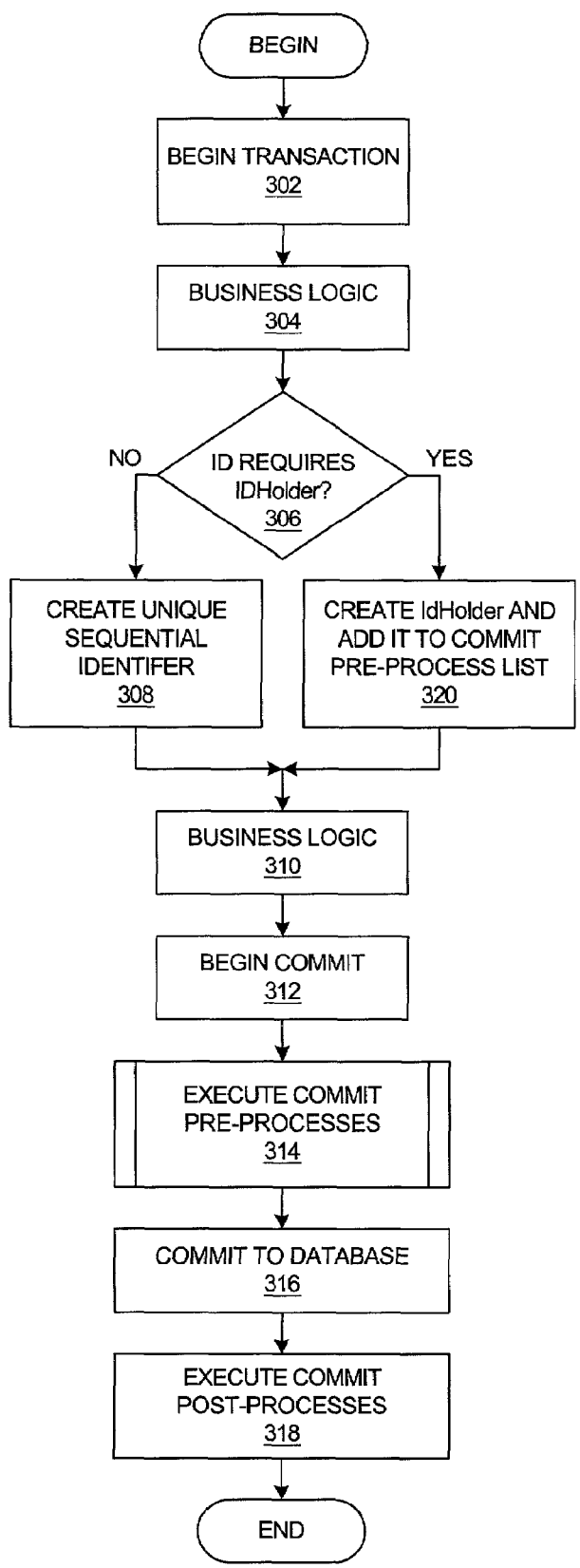
FIG. 3A is a flowchart that depicts the overall process of using lazy instantiation and late binding via a wrapper class for allocating a sequence of unique identifiers in accordance with the present invention.
Figure 3B:
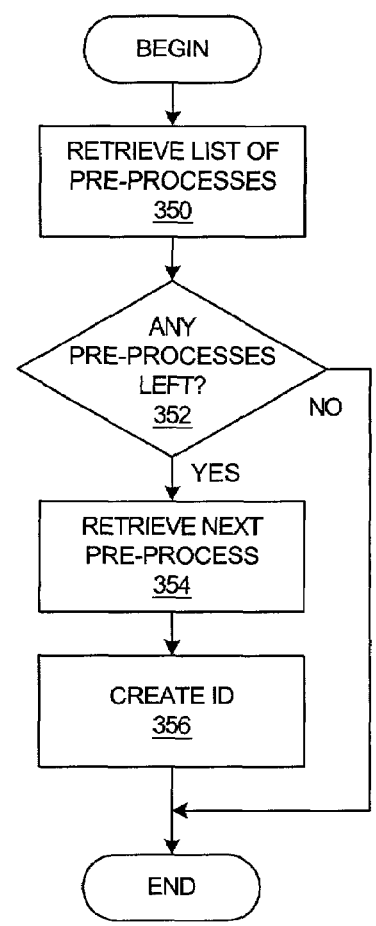
FIG. 3B is a flowchart that depicts a process of executing a series of pre-processes, each of which may generate or allocate a unique sequential identifier in accordance with the present invention.

With reference now to FIG. 3A, a flowchart depicts the overall process of using lazy instantiation and late binding via a wrapper class for allocating a sequence of unique identifiers in accordance with the present invention. As shown with respect to FIG. 2B, IdHolder objects can be created as needed. However, FIG. 2B does not describe the mechanism by which the values of the identifiers are eventually generated. FIG. 3A and FIG. 3B provide more explanation as to how the present invention uses late binding to obtain the identifiers when appropriate.

Referring to FIG. 3A, a particular transaction is explicitly started (step 302), and specific business logic may be executed (step 304). At some point in time, the logic determines whether to instantiate an object that needs a unique, sequential identifier (step 306). In other words, a determination is made as to whether or not an identifier should be created using the mechanism provided by the present invention. As noted above, objects of the IdHolder class can be used to act as a placeholder for an identifier, so a determination is made as to whether or not to generate an identifier using the IdHolder mechanism.

If there is no need to require that the identifier must be strictly sequential, then an identifier can be created/assigned at that time (step 308) without using an IdHolder object, and the process continues. Additional business logic may be executing (step 310), presumably using the identifier object. At some point, the process then begins to commit its results (step 312). The present invention stores a set of pre-processes and post-processes in order to delay or postpone processing tasks that are linked to the commit operation. The pre-processes could have been performed at an earlier time, but to have done so would have caused one or more other threads to have been synchronously blocked while the thread performed its processing. A set of commit pre-processes are performed (step 314), which is then followed by the database commit operation (step 316), which is then followed by the commit post-processes (step 318). The processing of a transaction with a unique identifier that is not sequential, as appropriately determined at step 306, is then complete.

However, it may be determined at step 306 that a unique, sequential identifier is required during the processing of a particular transaction. In response, an IdHolder object is created, and the actual creation or assignment of a value for the identifier is added to the list of commit pre-process tasks (step 320) prior to continuing with the business logic processing at step 310. For example, a subclass of the IdObject object may be instantiated, and a method within a transaction or session class is invoked to add the pre-process task while passing in the IdObject-class object that was just created. In this manner, the assignment of the identifier's value is delayed until the value is needed.

With reference now to FIG. 3B, a flowchart depicts a process of executing a series of pre-processes, each of which generate or allocate a unique, sequential identifier in accordance with the present invention. The process begins by retrieving a list of commit pre-process tasks (step 350). A loop is entered in which a determination is made as to whether there are any other commit pre-processes within the list (step 352). If so, then the next pre-process is obtained (step 354) and the unique identifier for the IdHolder object within the pre-process is created (step 356). The process then loops back to step 352 to determine whether there are other commit pre-process tasks to be processed. If not, then the process is complete. It should be noted that FIG. 3B merely provides further detail about the processing of pre-processes that involve IdObject objects, and the list of pre-process tasks could comprise many different types of tasks. Although not shown, a person of ordinary skill in the art would understand that a similar process is used for executing a series of post-processes after the database commit.

Late binding is achieved by adding pre-processes to the commit operation. As part of the commit operation within the database, each pre-process is executed in turn; a pre-process for the identifiers may simply invoke a method that causes the value of the identifier to be allocated. The late binding reduces the time window required by synchronization of identifier allocation.

With reference now to FIG. 4, a UML class diagram depicts an exemplary set of object-oriented classes that may be used in constructing an application in accordance with a preferred embodiment of the invention. Hereinafter, a check processing application is used as an exemplary application for the present invention. For example, the check processing application could be an application that prints bank checks or correlates cashed checks with bank accounts. In each case, the processing of a check represents a single transaction.

To construct the check application in an object-oriented manner, a Check class 402 is used as a concrete subclass of the IdObject abstract class 404. An instance of the Check class, i.e., a check object, may be used to represent a check transaction, or the check object may be one of many objects that are created and used during a single check transaction. In either case, the check object may be considered to be a transactional object.

The abstract class IdObject 404 gives an example implementation of the IdObjectIF interface 406. Although the above descriptions of the present invention referred to IdObject 404 as an exemplary class for practicing the present invention, in a more general case, any implementation of the IdObjectIF interface 406 is sufficient for practicing the present invention as it may not be easy to subclass IdObject 404 because of other restrictions in the class hierarchy.

The IdObject class 404 contains an instance of the IdHolder class 412 that serves to provide a late binding of the identifier. The IdHolder class 412 actually defers the implementation of allocating the identifier to a subclass of IdManager class 410; IdManager 410 is implemented as an abstract class that must be subclassed. In the example, the subclass of IdManager 410 is IdAllocator class 408. In the following examples, the actual implementation of allocating the identifier from a series of identifiers is not shown. One of ordinary skill in the art would realize that there could be a range of different implementations, which could include: using a database table to effectively lock the next identifier in the sequence; a methodology that provides unique but non-sequenced identifiers; a methodology that selects an identifier from a pre-assigned pool of identifiers; or other methodologies. The advantage of using the IdManager abstract class is that there is a common base implementation and interface for all of these cases.

The ServerContext class 418 is an example of a generic class that may be used to manage transaction operations and store transaction context on behalf of a server thread. The ServerContext class 418 typically defers transactional methods to another class, which would implement, for example, an interface named Session 420. Further implementation details are not shown as they are highly dependent on the transaction framework within which the present invention would be used.

The commit processing in the ServerContext class 418 consists of executing pre-processes, committing to the database, and then executing post-processes. The ServerContext class 418 uses a command-based interface named Process 416 that contains a single "execute" method. For this embodiment, the IdAllocation class 414 provides an implementation of the Process class 416 wherein the "execute" method calls back to the class that needs an identifier, which in this case is Check 402.

Figure 5:
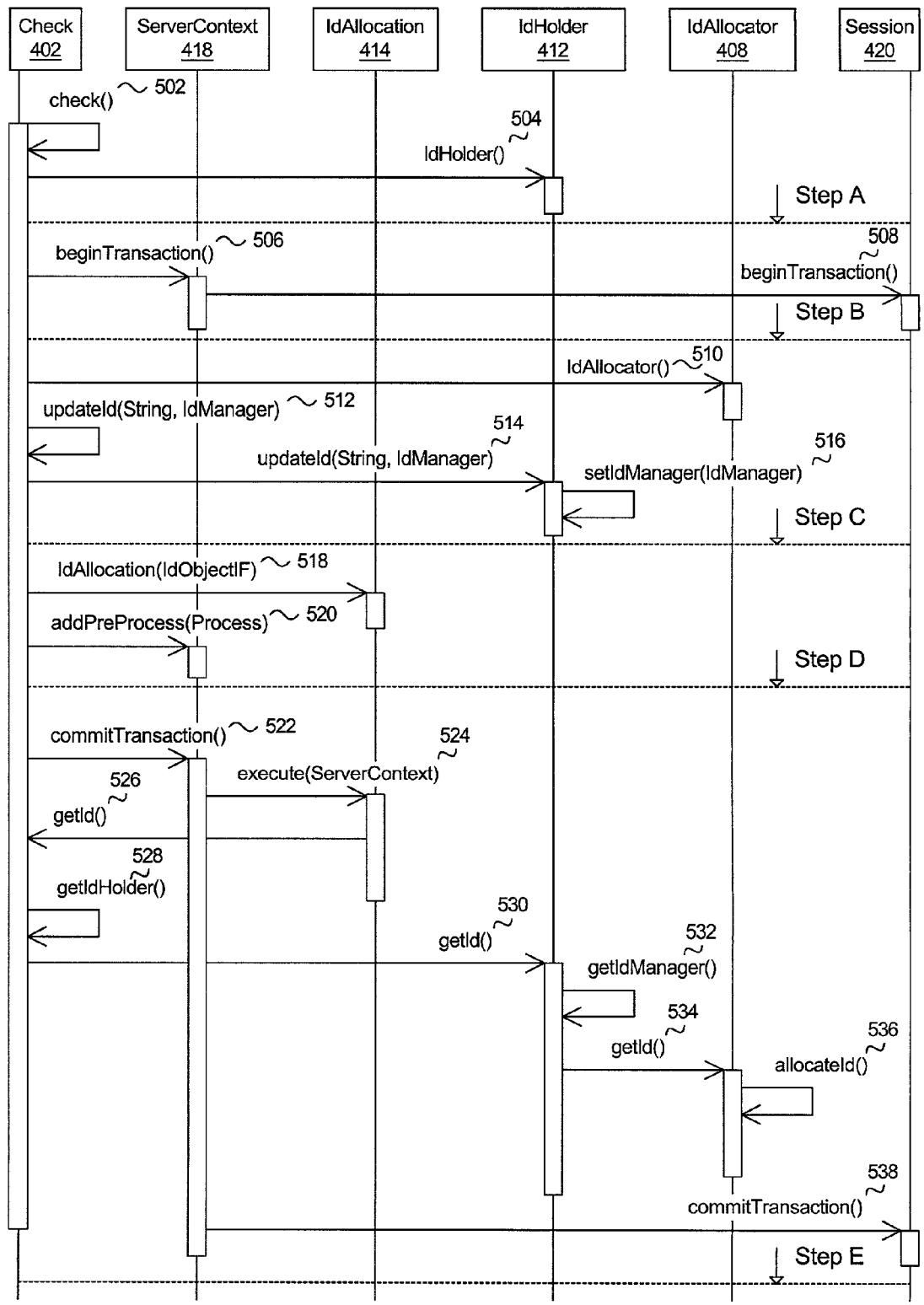
FIG. 5 depicts a UML sequence diagram showing an ordering of method calls in an example application in accordance with a preferred embodiment of the invention.

With reference now to FIG. 5, a UML sequence diagram shows an ordering of method calls that illustrate an example usage of the preferred embodiment of the present invention. There are essentially five major steps while processing a transaction, which are referred to herein as Steps A-E: (Step A) creating the instance of the Check class (method calls 502 through 504); (Step B) beginning the transaction (method calls 506 through 508); (Step C) selecting the manager class to be used to allocate an identifier for the check object (method calls 510 through 516); (Step D) adding the pre-process to the transaction (method calls 518 through 520); and (Step E) committing the transaction (method calls 522 through 538).

The method calls within the blocks of business logic are not shown in this example, but a person of ordinary skill in the art could determine the manner in which they could be accommodated in this sequence with reference to the previous figures. However, any general business logic that does not require the use of a unique, sequential identifier would be completed prior to method call 522 in step E because method call 522 initiates a series of steps for committing the transaction that assumes that a unique, sequential identifier might be required for some purpose. In other words, any general transactional processing would inherently be completed prior to attempting to finalize the results of the transactional processing. Hence, after method call 522, it may be assumed that the locking or synchronization mechanism for the identifier assignment process is engaged so that only one transaction at a time is attempting to obtain and use an identifier. In the example shown in FIG. 5, the transaction is successfully committed during method call 538, after which the locking or synchronization mechanism would be disengaged. If the transaction was aborted during Step E, then the locking or synchronization mechanism would be disengaged after performing some form of rollback processing to restore a unique, sequential identifier that may have already been allocated or assigned but not used. After the locking or synchronization mechanism is disengaged, then another transaction may attempt to obtain and use the released identifier. Again, further synchronization details are not shown as the synchronization mechanism would be highly dependent on the transaction framework within which the present invention would be used and the manner in which database commits would be handled.

With reference now to FIGS. 6-7K, a set of figures disclose object-oriented code that may be used to write an application in accordance with a preferred embodiment of the present invention. FIG. 6 depicts an object-oriented class that provides an example of a simple application that uses pre-processes in combination with IdHolder objects for allocating unique identifiers in accordance with the present invention. FIGS. 7A-7K depict a set of object-oriented classes that provide a set of base classes that support allocating unique identifiers in accordance with a preferred embodiment of the present invention. Common reference numerals have been used throughout the figures to refer to common elements. For example, the Check class 402 that was introduced in FIG. 4 is also shown in the UML sequence diagram in FIG. 5 and in the object-oriented programming language statements in FIG. 6. Similarly, the method calls that are shown in the UML sequence diagram in FIG. 5 are also shown in the source code shown in FIG. 6 and FIGS. 7A-7K. It should be noted that FIGS. 6-7K show only a portion of the source code that could be contained within the depicted classes and that the classes could contain other methods and programming language statements as appropriate for a given application.

Referring to FIG. 6, a newCheck static method 602 accepts as an input argument a particular processing context of type ServerContext; ServerContext class 418 is depicted in FIGS. 7J-7K. A new check object of class Check is instantiated at statement 604, which uses the constructor shown at statement 502 and is shown as method call 502 in FIG. 5.

The Check class extends the IdObject class 404, and the IdObject class has an attribute, i.e., class variable, of class IdHolder 412. Hence, during the object instantiation of the new check object at statement 604, the runtime environment ensures that any other objects that should be instantiated are also instantiated along with the new check object. In this case, an instance of IdHolder class 412 is also created, as shown by method call 504 in FIG. 5 and statement 504 in FIG. 7A, which concludes the portion of processing that includes the creation of the instance of the Check class (Step A).

In a series of steps similar to steps 302-304 shown in FIG. 3A, the newCheck method begins a transaction at statement 606 in FIG. 6 on the context object that was received as an input parameter, which is of type ServerContext. The beginTransaction method of class ServerContext 418, shown as method call 506 in FIG. 5 and at statement 506 in FIG. 7J, defers to the beginTransaction method in the implementation of the Session interface 420, shown as method call 508 in FIG. 5 and at statement 508 in FIG. 7C; this concludes the portion of processing that includes the initiation of a transaction (Step B). After the transaction has begun in FIG. 6, the newcheck method could continue with additional business logic processing, which is not shown within FIG. 6.

Statement 608 in FIG. 6 is used to specify the identifier allocation mechanism that is to be used with the check object. In this case, an instance of the IdAllocator class 408 is created, as shown by method call 510 in FIG. 5 and statement 510 in FIG. 7G. In more general terms, the IdAllocator object is an identifier management object that eventually allocates or assigns an identifier value using its identifier allocation methodology in accordance with the defined state of issuing sequential identifiers.

The IdAllocator object is then stored in the IdObject 404 superclass of the Check class 402 instance using the updateId method, shown as method call 512 in FIG. 5 and at statement 512 in FIG. 7A. The updateId method of the IdObject class then defers (at statement 750 in FIG. 7A) to the updateId method on the IdHolder class 412, which is shown as method call 514 in FIG. 5 and at statement 514 in FIG. 7I. The updateId method of the IdHolder class then stores (starting at statement 752 in FIG. 7I) the IdAllocator instance (which was just created at statement 608 or method call 510) into the IdManager class instance 754 in FIG. 7H (the IdManager class instance would have been previously created at method call 504 when the IdHolder class instance was created) using the setIdManager method of the IdHolder class, shown as method call 516 in FIG. 5 and at statement 516 in FIG. 7I. In more general terms, an identifier management object is set within the transactional object, which will invoke a method on the identifier management object to obtain a unique sequential identifier at the proper time; this concludes the portion of processing that includes the selection of the identifier management class to be used to allocate an identifier for the transactional object (Step C). A person with ordinary skill in the art will realize that the IdAllocator class 408 is a subclass of IdManager class 410 as described previously, so this type cast in storing the IdManager instance during method call 516 is non-problematic.

A commit pre-process task is then added to a list of pre-processes at statement 610 in FIG. 6. The call to the addPreProcess method in statement 610 includes a call to the constructor for the IdAllocation class 414, shown as method call 518 in FIG. 5 and at statement 518 in FIG. 7E. Referring to FIG. 7E, the IdAllocation class 414 has an attribute, i.e., class variable, named idObject 702 for storing a reference to an instance that implements the IdObjectIF interface 406, which in this case is the instance of the Check class 402, which is passed as an input parameter to the IdAllocation constructor in statement 610. As shown in the IdAllocation constructor at statement 518, the idObject attribute of the IdAllocation class is set to the object that is received as an input argument; this object is thereby stored for subsequent processing at some later time. In other words, the check object is stored within the IdAllocation object, which is then saved as a pre-process task, as explained below.

The invocation of the addPreProcess method at statement 610 accepts the newly instantiated IdAllocation object as an input argument. The addPreProcess method, shown as method call 520 in FIG. 5 and at statement 520 in FIG. 7J, would add the IdAllocation object as a commit pre-process task to a list of pre-process elements, i.e., as a pre-process object in a list of pre-process objects; this concludes the portion of processing that includes adding the pre-process task to the transaction (Step D). At some later point in time, the operations associated with allocating/assigning a unique identifier and with using the identifier would be invoked by executing the stored pre-process operation.

As mentioned previously, the exemplary source code does not show all of the processing steps that might be appropriate for accomplishing all desired check operations within the application, and other business logic might be performed between statement 610 and statement 612 in a manner similar to that shown in step 310 of FIG. 3A. Eventually, statement 612 is reached; statement 612 shows a call to the commitTransaction method that contains the logic for the commit operation in a manner similar to that shown in steps 312-318 of FIG. 3A.

The remaining method calls in FIG. 5 relate to initiating a series of steps that culminate in committing the transaction, i.e., the final overall step in initiating and completing a transaction (Step E). It is during the processing prior to the final commit operation that the value of the unique identifier will be assigned to the check object that was allocated within the newCheck method. Reiterating this point, statements 604-610 in FIG. 6 have postponed the assignment of a unique identifier for the check object; method calls 502 through 520 in FIG. 5 have yet to invoke a method that assigns an identifier to the check object. However, at statement 612 in FIG. 6, the invocation of the commitTransaction method initiates a set of method calls, shown as method calls 522-538 (Step E) in FIG. 5, that eventually assigns an identifier to the check object prior to the final commit operation, as is now explained in more detail below.

Referring to FIGS. 7J-7K, a ServerContext class is declared at statement 418. FIGS. 7J-7K show some of the methods within the ServerContext class that are used to manage and process transactions; other methods could be included as appropriate. In addition to the addPreProcess method at statement 520 that was previously mentioned, a corresponding addPostProcess method at statement 704 allows commit post-process tasks to be created as discussed with respect to FIG. 3A. The beginTransaction method that was called by statement 606 in FIG. 6 is shown at statement 506 in FIG. 7J.

The commitTransaction method that was called by statement 612 in FIG. 6 is shown as method call 522 in FIG. 5 and at statement 522 in FIG. 7K. Statement 706 in FIG. 7K controls a loop for processing the pre-process tasks within the list of pre-process objects, while statement 706 controls a loop for processing the post-process tasks within the list of post-process objects. Statement 708 shows the point at which the transaction is actually committed.

During the loop controlled by statement 706, the next object on the pre-process list is obtained at statement 712, and statement 714 calls that object's "execute" method. These steps are similar to the steps shown in FIG. 3B.

As discussed above with the check application example from FIG. 4 and FIG. 6, the allocation of a unique identifier for the check object can be postponed using the present invention. Assuming that the type of pre-process object that is currently being processed at statement 714 is an object of IdAllocation class 414, as might have been instantiated by statement 518, the "execute" method of the IdAllocation class would be called, shown as method call 524 in FIG. 5 and at statement 524 in FIG. 7E. At statement 756 in FIG. 7E, the "execute" method calls the getId method of the object that was stored within the class variable idObject, which in this case is the instance of the class Check 402. Hence, the method call to the getId method of the check object is shown as method call 526 in FIG. 5. The check object is an instance of the Check class 402, which itself is a subclass of the IdObject class 404; therefore, since the Check class 402 does not declare a getId method, the getId method of the IdObject class 404 is called (by the property of inheritance), which is shown at statement 526 in FIG. 7A.

The getId method of the IdObject class defers to the getId method of the IdHolder object that is stored as a class variable within the IdObject class 404, as shown at statement 758 in FIG. 7A. Hence, a call is made to the getIdHolder method of the IdObject class, shown as method call 528 in FIG. 5 and at statement 528 in FIG. 7A, which returns the IdHolder object that is stored in the class variable within the IdObject class. A call is then made to the getId method of the IdHolder object, shown as method call 530 in FIG. 5 and at statement 530 in FIG. 7H.

The getId method at statement 530 is written so that it can detect whether an IdManager object has been previously stored within the instance of the IdHolder class; in the check processing example, an IdManager object was previously stored through a sequence of steps that was initiated by statement 608 in FIG. 6 (Step C). Hence, statement 760 in FIG. 7H is executed.

At statement 760, the getId method of the IdHolder class defers to the getId method of the IdManager object that is stored as a class variable within the IdHolder class 412. Hence, a call is made to the getIdManager method of the IdHolder class, shown as method call 532 in FIG. 5 and at statement 532 in FIG. 7H, which returns the IdManager object that is stored in the class variable within the IdHolder class. A call is then made to the getId method of the IdManager object, shown as method call 534 in FIG. 5.

As mentioned above, an IdManager object was previously stored through a sequence of steps that was initiated by statement 608 in FIG. 6 (Step C). In this example, an instance of the IdAllocator class was stored as the IdManager object, and the IdAllocator class explicitly defines a getId method. Therefore, the getId method that is called at statement 760 (and corresponds to method call 534 shown in FIG. 5) is the getId method of the IdAllocator class, which is shown at statement 534 in FIG. 7G.

In this implementation of the present invention, the getId method at statement 534 is written so that it merely calls (at statement 762 in FIG. 7G) the allocateId method of the IdAllocator class, shown as method call 536 in FIG. 5 and at statement 536 in FIG. 7G rather than 766 in FIG. 7F. The allocateId method would allocate a unique identifier as appropriate to the methodology that is coded within the method; for the check application example, it may be presumed that the allocation methodology would be a series of unique, sequential, identifiers. As mentioned previously, an advantage of the preferred embodiment of the present invention is that multiple allocation implementations could be deployed by subclassing the IdManager class in different manners, wherein a specific allocation methodology could be selected for a given application, such as the check processing application that has been used as an example herein.

The most common final use of the actual identifier is that it is stored in the database record corresponding to the newly created check object. Although not shown in this example, one possible use of the check identifier is after the database commit has been completed, e.g., a post-process is executed that physically prints the check. A simpler example is to simply return the check identifier on a subsequent inquiry function.

FIGS. 7A-7K represent a set of Java classes; this set of base classes support allocating identifiers in accordance with a preferred embodiment of the present invention, and this set of base classes could be used for many different applications other than the check application example that was described above. The methods and classes that are shown within FIGS. 7A-7K provide for robust identifier management by allowing different types of managers to be used as appropriate for the type of IdObject that is being implemented. Many different classes may be subclassed from the IdManager class in order to implement different identifier management requirements for different subclasses. Hence, it may be desirable to provide methods for getting and setting the manager of a particular object. Assuming that an object is an instance of class IdHolder 412, the getIdManager method 532 returns the ID manager for a particular IdHolder object, while the setIdManager method 516 allows the ID manager for a particular IdHolder object to be set. The setId method 764 in FIG. 7I allows the identifier of an IdHolder object's manager to be set to a particular pre-assigned value rather than using an identifier allocation mechanism. One example use of pre-assigned identifiers is migration of existing data that already has had the identifiers assigned by some other method.

The advantages of the present invention should be apparent in view of the detailed description of the invention that is provided above. In the prior art, if a first thread allocates a unique, sequential identifier, and a second thread also needs to allocate a unique, sequential identifier, then the second thread would be blocked while waiting for the first thread to indicate that its identifier within the sequence has been successfully used, such as committing it to a database. If the first thread aborts its transaction, then complex processing must be performed to ensure that the identifier provided to the first thread could be reused.

With the present invention, by postponing the allocation or assignment of the identifier, multiple threads can run concurrently while ensuring the integrity of the allocation process for unique, sequential identifiers. The use of late binding via commit pre-processes reduces the time window required by synchronization of identifier allocation, thereby increasing the processing speed for each transaction.

It is important to note that while the present invention has been described in the context of a fully functioning data processing system, those of ordinary skill in the art will appreciate that some of the processes associated with the present invention are capable of being distributed in the form of instructions in a computer readable storage medium and a variety of other forms, examples of computer readable storage media include media such as EPROM, ROM, tape, paper, floppy disc, hard disk drive, RAM, and CD-ROMs and transmission-type media, such as digital and analog communication links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for allocating a sequential identifier while processing a transaction, the method comprising:
    creating a transactional object for the transaction in an object-oriented environment, wherein the transactional object comprises an identifier data item;
    generating a pre-process object comprising the transactional object;
    adding the pre-process object to a list of pre-process objects that are to be processed prior to committing the transaction;
    processing the pre-process object, wherein processing the pre-process object allocates a sequential identifier value for the identifier data item; and
    committing the transaction;
    wherein the step of creating a transactional object for the transaction further comprises:
        instantiating an object of a first class, wherein the first class is a subclass of a second class, wherein the second class comprises a class variable for an identifier holder object; and
        instantiating the identifier holder object, wherein the identifier holder object comprises the identifier data item;
    generating an identifier management object for the transactional object; and setting the identifier management object within the identifier holder object;
    invoking a method of the identifier holder object to initiate allocation of the sequential identifier value during processing of the pre-process object; and
    invoking a method of the identifier management object to allocate the sequential identifier value for the identifier data item.

2. The method of claim 1 further comprising: engaging a locking mechanism to synchronize assignment of sequential identifiers prior to processing the pre-process object.

3. The method of claim 2 further comprising: disengaging the locking mechanism subsequent to committing the transaction.

4. The method of claim 1 further comprising: generating an identifier management object for the transactional object; and setting the identifier management object within the transactional object.

5. The method of claim 4 further comprising: invoking a method of the identifier management object to allocate the sequential identifier value for the identifier data item during processing of the pre-process object.

6. The method of claim 4 wherein the identifier management object comprises the identifier data item.

7. An apparatus for allocating a sequential identifier while processing a transaction, the apparatus comprising:
    means for creating a transactional object for the transaction in an object- oriented environment, wherein the transactional object comprises an identifier data item;
    means for generating a pre-process object comprising the transactional object;
    means for adding the pre-process object to a list of pre-process objects that are to be processed prior to committing the transaction;
    means for processing the pre-process object, wherein processing the pre-process object allocates a sequential identifier value for the identifier data item; and
    means for committing the transaction;
    wherein the means for creating a transactional object for the transaction further comprises:
        means for instantiating an object of a first class, wherein the first class is a subclass of a second class, wherein the second class comprises a class variable for an identifier holder object: and
        means for instantiating the identifier holder object, wherein the identifier holder object comprises the identifier data item;
    means for generating an identifier management object for the transactional object; and setting the identifier management object within the identifier holder object;
    means for invoking a method of the identifier holder object to initiate allocation of a sequential identifier value during processing of the pre-process object; and
    means for invoking a method of the identifier management object to allocate the sequential identifier value for the identifier data item.

8. The apparatus of claim 7 further comprising: means for engaging a locking mechanism to synchronize assignment of sequential identifiers prior to processing the pre-process object.

9. The apparatus of claim 8 further comprising: means for disengaging the locking mechanism subsequent to committing the transaction.

10. The apparatus of claim 7 further comprising: means for generating an identifier management object for the transactional object; and means for setting the identifier management object within the transactional object.

11. The apparatus of claim 10 further comprising: means for invoking a method of the identifier management object to allocate the sequential identifier value for the identifier data item during processing of the pre-process object.

12. The apparatus of claim 10 wherein the identifier management object comprises the identifier data item.

13. A computer program product on a computer readable storage medium for use in a data processing system for allocating a sequential identifier while processing a transaction, the computer program product comprising:
  instructions for creating a transactional object for the transaction in an object-oriented environment, wherein the transactional object comprises an identifier data item;
  instructions for generating a pre-process object comprising the transactional object;
  instructions for adding the pre-process object to a list of pre-process objects that are to be processed prior to committing the transaction;
  instructions for processing the pre-process object, wherein processing the pre-process object allocates a sequential identifier value for the identifier data item; and instructions for committing the transaction;
  wherein the step of creating a transactional object for the transaction further comprises:
    instructions for instantiating an object of a first class, wherein the first class is a subclass of a second class, wherein the second class comprises a class variable for an identifier holder object; and
    instructions for instantiating the identifier holder object, wherein the identifier holder object comprises the identifier data item;
  instructions for generating an identifier management object for the transactional object; and setting the identifier management object within the identifier holder object;
  instructions for invoking a method of the identifier holder object to initiate allocation of the sequential identifier value during processing of the pre-process object; and
  instructions for invoking a method of the identifier management object to allocate the sequential identifier value for the identifier data item.

14. The computer program product of claim 13 further comprising: instructions for engaging a locking mechanism to synchronize assignment of sequential identifiers prior to processing the pre-process object; and instructions for disengaging the locking mechanism subsequent to committing the transaction.

* * * * *